United States Patent [19]
Hoffmann et al.

[11] 4,070,039
[45] Jan. 24, 1978

[54] PASSIVE VEHICLE SAFETY BELT APPARATUS

[75] Inventors: Günter Hoffmann, Gifhorn; Wilfried Köpke, Sulfeld, both of Germany

[73] Assignee: Volkswagenwerk Aktiengesellschaft, Germany

[21] Appl. No.: 654,054

[22] Filed: Jan. 30, 1976

[30] Foreign Application Priority Data

Feb. 13, 1975  Germany ............................ 2505971

[51] Int. Cl.² ............................................ B60R 21/02
[52] U.S. Cl. .................................... 280/745; 297/389
[58] Field of Search ................ 280/744, 745, 747; 180/82 C; 24/265 AL, 77 R, 164; 297/385, 389

[56] References Cited

U.S. PATENT DOCUMENTS

| | | | |
|---|---|---|---|
| 3,764,161 | 10/1973 | Bright et al. | 297/388 X |
| 3,771,814 | 11/1973 | Hahn | 280/745 |
| 3,877,114 | 4/1975 | Silen | 280/744 X |
| 3,897,963 | 8/1975 | Seiffert et al. | 297/388 X |
| 3,917,019 | 11/1975 | Pearson et al. | 280/745 X |
| 3,968,978 | 7/1976 | Hayashi | 280/745 |

FOREIGN PATENT DOCUMENTS 1,366,589  6/1964  France ............................ 297/389

*Primary Examiner*—Joseph F. Peters, Jr.
*Assistant Examiner*—Michael J. Forman
*Attorney, Agent, or Firm*—Brumbaugh, Graves, Donohue & Raymond

[57] ABSTRACT

A passive vehicle safety belt apparatus includes a diagonal shoulder belt which passes through a diverting device, mounted to the vehicle door adjacent to the vehicle seat at a level corresponding to the shoulder of a vehicle occupant, to a belt winding device mounted to the door. The belt diverting device is mounted to the vehicle door by a manually severable connection to enable safe exit from the vehicle, in the event the belt winding device is disabled by the occurrence of an accident.

3 Claims, 2 Drawing Figures

PASSIVE VEHICLE SAFETY BELT APPARATUS

BACKGROUND OF THE INVENTION

This invention relates to vehicle safety belts and in particular to a passive safety belt apparatus which automatically applies a safety belt to a vehicle occupant upon entering the vehicle and closing the door. More particularly the present invention relates to such passive vehicle safety belts wherein the safety belt is provided with a winding device mounted to the vehicle door and belt diverting device mounted to the vehicle door adjacent to the vehicle seat at a height corresponding to the shoulder of a passenger.

Prior passive safety belt arrangements, such as described by Seiffert, et al in U.S. Pat. No. 3,895,822 have a diagonal shoulder belt which is afixed to the vehicle frame adjacent to the seat on the side away from the vehicle door by a winding device and afixed to the vehicle door at a height corresponding to the shoulder level of the vehicle occupant. Seiffert shows the use of releasable interconnection between segments of the diagonal shoulder belt to be used in the event the belt winding device is disabled during a vehicle collision, so that the vehicle occupant or others can effectuate the release of the diagonal belt, thereby allowing the occupant to leave the vehicle. The releasable interconnection provided by Seiffert is not normally used by the vehicle occupant since the safety belt is automatically applied upon entry into the vehicle and closing of the door. The interconnection is provided only in the event that following an accident there results a blocking of the action of the belt winding device preventing an opening of the vehicle door and safe exit of the vehicle occupant. In accordance with Seiffert, the interconnection is located in the vicinity of the fastening point of the shoulder belt to the door frame, adjacent to the door window, so that in the event of an accident in which the vehicle occupant has been rendered unconscious, it is possible to release the belt connection from outside the vehicle.

A belt interconnection arrangement such as disclosed by Seiffiert is unsuitable in the event the safety belt is provided with a belt diverting device at shoulder height on the door and a winding device mounted to the door since the belt interconnection device would be unable to pass through the belt diverting device.

OBJECTS OF THE INVENTION

It is therefore an object of the present invention to provide a passive vehicle safety belt apparatus wherein the safety belt is applied to the vehicle occupant upon entering the vehicle and closing the vehicle door.

It is a further object of the present invention to provide such a passive safety belt apparatus wherein the safety belt may be released in the event the belt winding device becomes disabled in a vehicle accident.

It is a still further object of the present invention to provide such a passive safety belt apparatus, wherein the safety belt may be released from the vehicle occupant from outside the vehicle.

SUMMARY OF THE INVENTION

In accordance with the present invention there is provided a passive vehicle safety belt apparatus, usable in connection with a vehicle seat adjacent to a vehicle door. The safety belt apparatus includes a belt winding device mounted to the vehicle door and a belt diverting device mounted to the vehicle door by a manually severable connection, adjacent to the vehicle seat at a level corresponding to the shoulder of a vehicle occupant. A diagonal shoulder belt is mounted across the seat, passing through the diverting device to the belt winding device.

In accordance with a preferred embodiment of the invention, the severable connection is achieved by a locking device provided with an actuating key which faces outwardly from the vehicle in the region of the window of the vehicle door.

For a better understanding of the present invention together with other and further objects thereof, reference is had to the following description, taken in conjuction with the accompanying drawings and its scope will be pointed out in the appended claims.

DETAILED DESCRIPTION OF THE INVENTION

Figure 1:
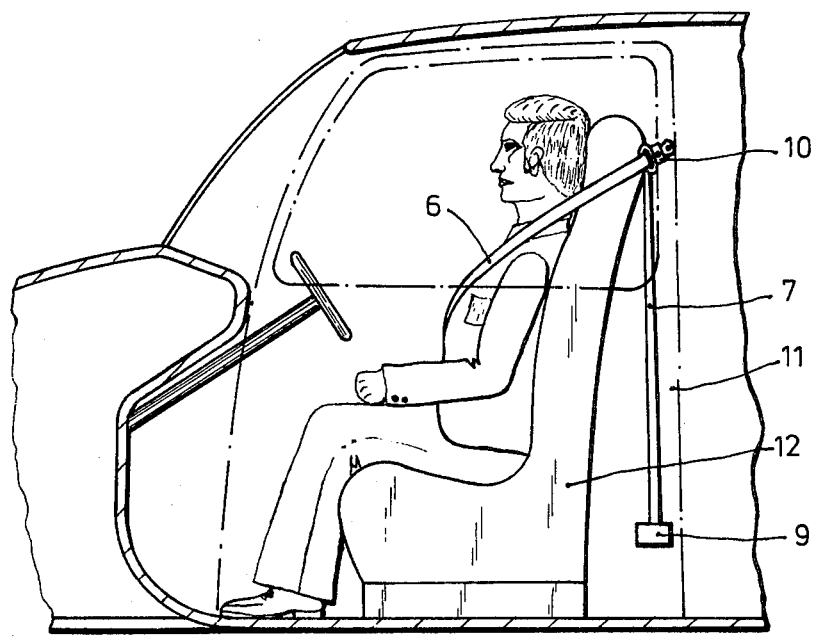
FIG. 1 is a cut-away view of an auto having a safety belt apparatus in accordance with the present invention.

FIG. 1 is a partial cut-away illustration of a vehicle having a safety belt apparatus in accordance with the present invention. In FIG. 1 there is shown diagonal shoulder belt 6 which passes across the vehicle occupant to a belt diverting device 10 which is mounted to the vehicle door at a level corresponding to the shoulder height of a vehicle occupant. After passing through belt diverting device 10, a segment 7 of the belt is attached to a belt winding device 9 which is mounted to the vehicle door 11.

As may be seen in FIG. 1, the safety belt apparatus in accordance with the present invention is most usable in connection with a vehicle seat 12 which is adjacent to a door 11 of the vehicle. The safety belt apparatus is a passive device in that it is automatically applied when the occupant enters the vehicle and closes the door. From the drawing of FIG. 1 it may be seen that as door 11 is opened the safety belt 6, 7 is unrolled from belt winding device 9 and passes through diverting device 10, and, as the door is further opened, belt portion 6 is lifted off the occupant. The occupant can then exit from the vehicle without detaching the safety belt from the vehicle or from the door. When an occupant enters the vehicle the closing of the door causes the safety belt to automatically be applied to his person and the winding device 9 causes the safety belt to be adjusted to an appropriate tension.

Figure 2:
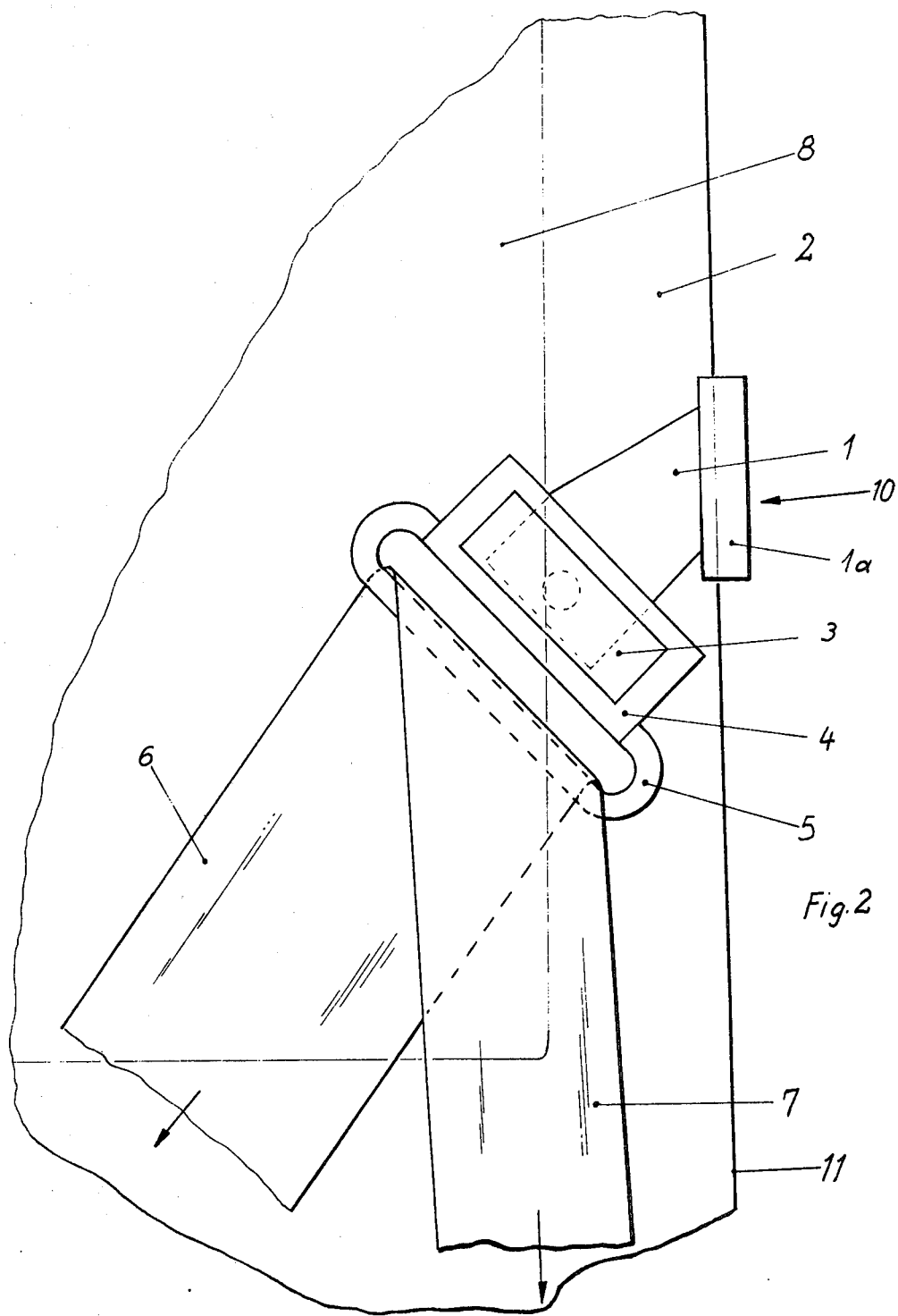
FIG. 2 is a detailed view of the belt diverting device used in the safety belt apparatus of FIG. 1.

FIG. 2 is a detailed view of belt diverting device 10 used in the FIG. 1 embodiment. Illustrated in FIG. 2 is a partial section of the frame 2 and the window 8 of vehicle door 11. A fastening plate 1 is mounted to frame 2 by a mounting element 1 a. The mounting is at approximately the level of the shoulder of the vehicle occupant and on the side of the door containing the latch. Fastening plate 1 is designed as a lock insertion plate, capable of being introduced into the accomodating opening of lock receiving element 4 to which is attached a belt diverting loop 5 comprising an oval ring. Lock receiving device 4 includes a manually actuated depression key 3 by means of which the connection between lock receiving device 4 and lock insertion plate 1 can be dissolved.

The principal characteristics of the present invention is the fact that belt diverting device 10 contains a diverting ring 5 which is detachably mounted to vehicle door 11. In the event of permanent blocking of the winding device 9 sufficient belt slack can be released, for opening of the door and having the vehicle occupant leave the vehicle, by detaching diverting ring 5 from its mounting 1 to the vehicle door. In addition, it is possible for rescue personnel on the outside of the vehicle to detach diverting ring 5 from the vehicle frame by depressing key 3 from the outside of the vehicle through window 8, since the entire belt diverting device 10 is mounted adjacent to window 8 of vehicle door 11. For convenience in this respect the actuating key 3 may be located on the side of the belt diverting device 10 facing outwardly from the vehicle.

Those skilled in the art will recognize that it is possible to arrange the lock insertion device in connection with diverting loop 5 and to arrange the lock receiving device in connection with the mounting 1 a. In addition, the mounting device 1 a may also contain, in accordance with U.S. Pat. No. 3,836,172 to Hilderbrandt, a securing bolt maintained in the lock side surface area of the vehicle door, which on closing the vehicle is engaged behind a holding plate fastened to the door column. In this matter a load occurring in the safety belt in case of restraint is conducted directly to the vehicle frame and deformation of the vehicle door is avoided.

While there have been described what are believed to be the preferred embodiments of the invention, those skilled in the art will recognize that other and further modifications may be had thereto without departing from the true spirit of the invention, and it is intended to claim all such embodiments which fall within the true scope of the invention.

We claim:

1. A passive vehicle safety belt apparatus, useable in connection with a vehicle seat adjacent to a vehicle door, comprising:

a belt winding device mounted to said vehicle door;

a belt diverting device arranged adjacent to said vehicle door at a level corresponding to the shoulder height of a vehicle occupant;

a manually operable latch interconnecting said belt diverting device with said vehicle door;

and a diagonal shoulder belt having one end mounted adjacent said seat on the side away from said door, extending across said seat and passing through said belt diverting device to said belt winding device;

whereby when said latch is activated to release the connection between said diverting device and said vehicle door said belt extends across said seat in a slackened condition.

2. A passive vehicle safety belt apparatus as specified in claim 1 wherein said manually operable latch comprising a locking device provided with an actuating key.

3. A passive vehicle safety belt apparatus as specified in claim 2 wherein said actuating key faces outward from the vehicle in the region of a window on said vehicle door.

* * * * *